Aug. 18, 1953  A. BUR  2,648,976
METHOD AND APPARATUS FOR GAS SAMPLING AND
RECORDING ANALYSES AND TEMPERATURES
Filed April 12, 1946  3 Sheets-Sheet 1
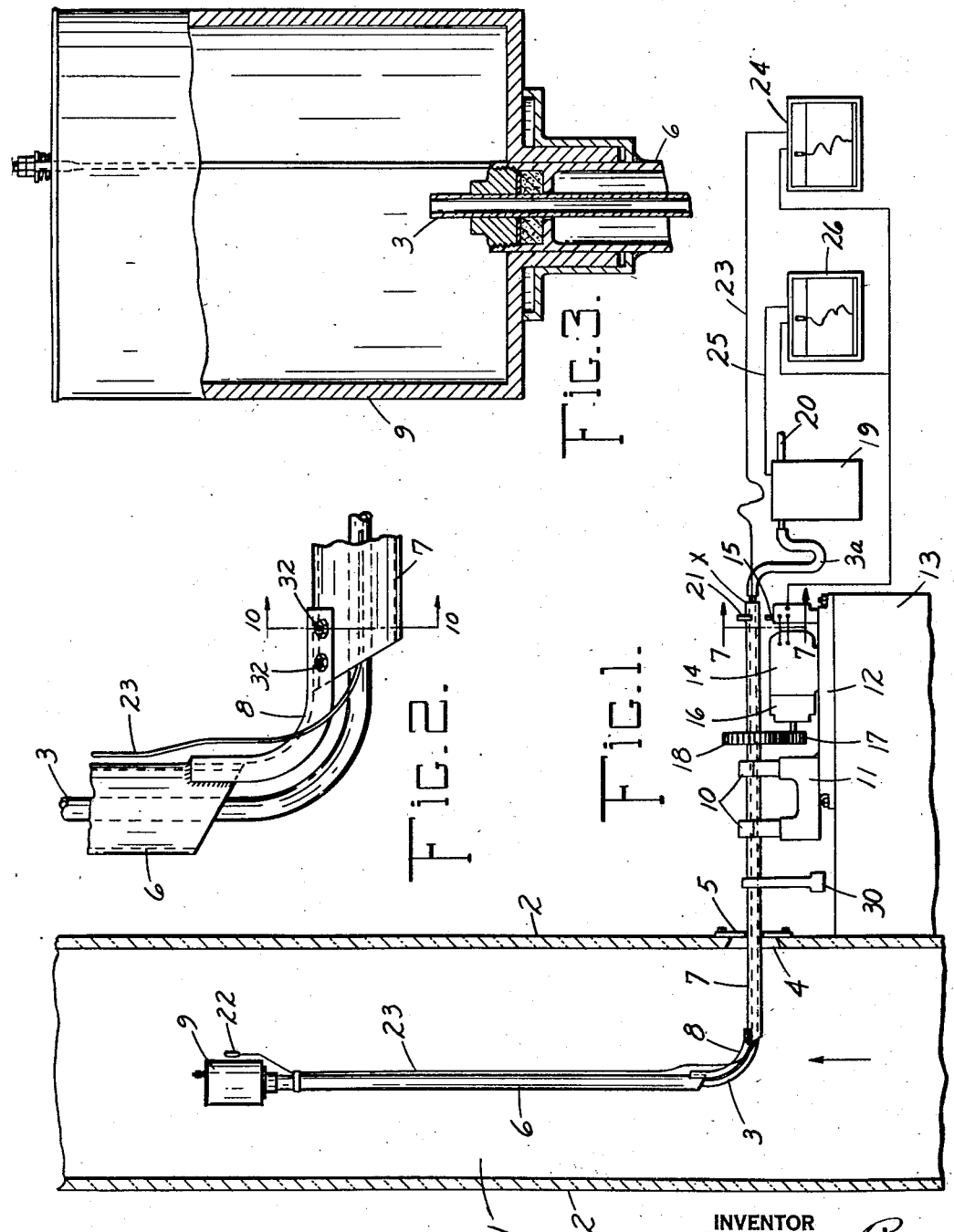
INVENTOR
Armand Bur
BY
Robert Robb
ATTORNEYS

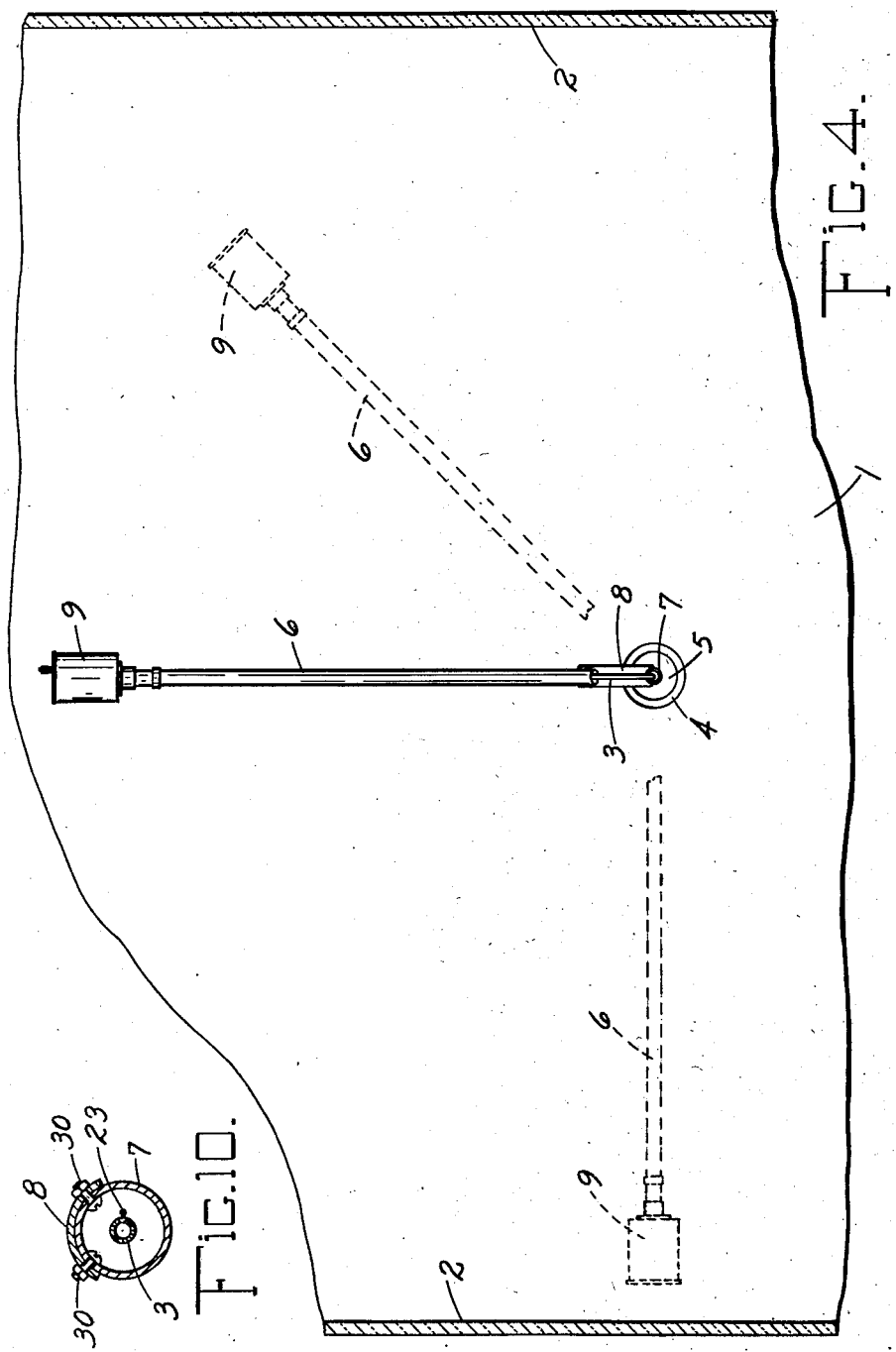

Aug. 18, 1953 A. BUR 2,648,976
METHOD AND APPARATUS FOR GAS SAMPLING AND
RECORDING ANALYSES AND TEMPERATURES
Filed April 12, 1946 3 Sheets-Sheet 3
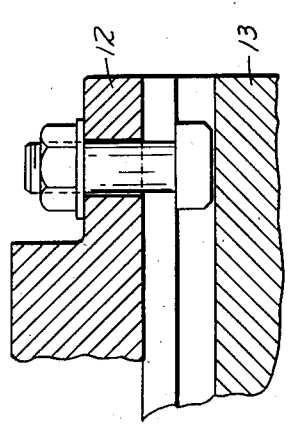
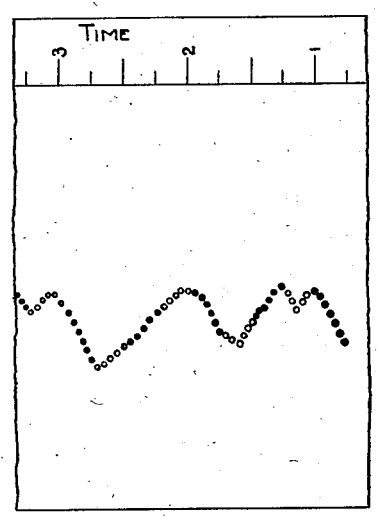
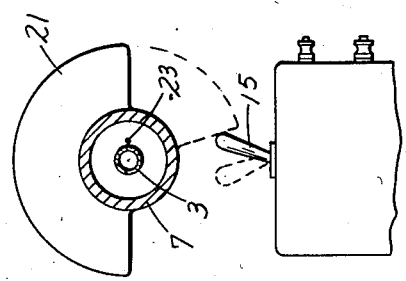
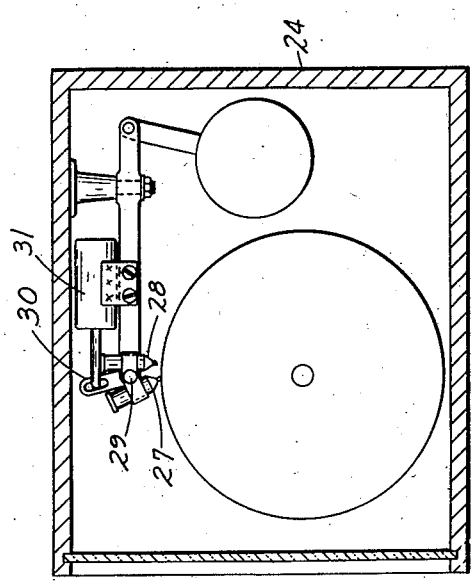
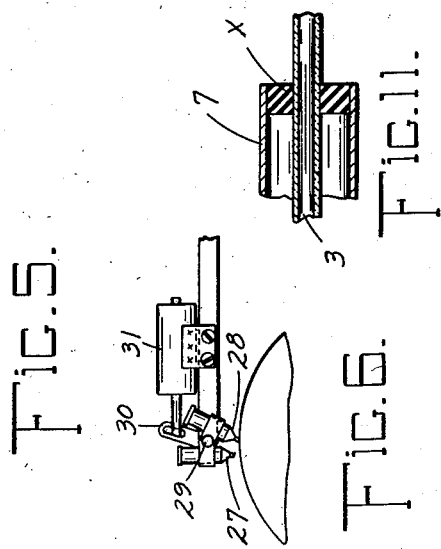
INVENTOR
Armand Bur
BY Robert Robb
ATTORNEYS Patented Aug. 18, 1953

2,648,976

UNITED STATES PATENT OFFICE 2,648,976

METHOD AND APPARATUS FOR GAS SAMPLING AND RECORDING ANALYSES AND TEMPERATURES

Armand Bur, Cleveland, Ohio, assignor of one-half to John F. Robb, John W. Robb, both of Cleveland Heights, and Frank B. Robb, Cleveland, Ohio, jointly Application April 12, 1946, Serial No. 661,583

9 Claims. (Cl. 73—23)

My present invention involves a novel method and novel apparatus for taking gas samples for determining the $CO_2$ or $O_2$ in percentage by volume, and also the temperature, of furnace exit gases. While my invention is primarily designed for use with a furnace outlet, it is within the purview of the invention to avail thereof in conjunction with chambers of different classes for testing and recording gas conditions therein.

In the carrying out of my invention I contemplate using my method and apparatus in such a manner that the gas samples are obtained from different points over a cross sectional area of the furnace breeching or outlet, or equivalent chamber from which the samples are desired to be taken, by effecting a periodic traverse of the receiving end of the sampling tube across such cross sectional area, such traverse being automatic and being reversed when the sampling tube receiving portion reaches the limit of its movement in one direction. By slowly moving the sampling tube in the manner above referred to, first in one direction and then returning the same by movement in an opposite direction, a complete point by point check of the furnace condition can be made and properly recorded on the conventional strip chart recorder.

It is further contemplated by my invention to utilize my gas sampling means above referred to, and method of operation of the same, not only for gas analyses, but for temperature recording. To this end it is proposed by my invention to locate in association with the receiving filtering thimble of the gas sample tube a suitable thermocouple connected in a suitable manner in the customary potentiometer or recording chart, whereby temperature recording is obtained as well as gas analyses, so that the gas and temperature conditions are secured for a complete cross sectional area of a boiler outlet, and the temperature recording is caused to exactly correspond to that of the gas analyses recording.

In line with the foregoing objective, it is highly important for the purposes of my invention that in the operation thereof there shall be obtainable point to point gas analyses over the entire cross section of the duct according to the timing and recording shown by a suitable recording instrument employed, and also to obtain the exact temperatures throughout the cross section of such duct simultaneously with the said anlayses in order that what is happening in the duct at all points of its cross section may be fully and definitely determined. In many instances the temperature condition which is ascertained and duly recorded by suitable instrument means employed by me will indicate to the user of my invention a particular condition and likewise the analysis taken and recorded incident to movement of the sampling tube will indicate the particular condition existing as the samples of gases, etc. are taken. Under some conditions, however, the temperature recordings and the analysis recordings apprise the user of my invention of a condition existing due to the cooperative recording at a certain point in the cross section of the duct that might not be definitely ascertained incident to the employment of a single one of the condition control and determining devices. Therefore, it is highly desirable that the gas analyses as well as temperature conditions, occurring at different points over the cross section of the duct shall be simultaneously available. The recording means employed by me for recording the temperature conditions and the analyses of the gas in the duct or equivalent conduit or chamber should be such as will enable a definite ascertaining of the particular point at which the analyses and temperature conditions are secured throughout the cross section of such duct or chamber, and my invention provides means readily enabling the foregoing objective to be achieved.

A further object of my invention has been to so design the recording means for both gas analyses and temperature conditions as to indicate the direction of the traverse of the receiving portion of the sampling tube and associated thermocouple, which, according to my invention, is of course moved in opposite directions periodically and automatically.

The method and apparatus of the inventor are adapted to be primarily applied to a furnace breeching or outlet or equivalent chamber wherein it is desirable and in the interest of economy to obtain representative samples of gases within the chamber to determine the actual existing mixture of fuel and air, at the same time to obtain the temperature of such samples recording all of the foregoing, namely the analysis of the gas and the temperature of the gas at the time of exit into a sampling tube, so as to definitely fix the conditions which do exist in the furnace breeching or outlet continuously throughout operation of the furnace, so as to maintain the said furnace in its highest operating efficient state, and at every point across the outlet.

In carrying out the concept above generally described, the applicant has provided a mechanism which will obtain the necessary samples, within the furnace outlet, by moving a sampling tube or similar device to and fro across the said outlet so as to pass thru various strata of flue gases, taking the temperatures and analyzing the gas samples, recording the same and having the same available for inspection by the person who is in control of the furnace, so as to determine whether the said furnace is in all cases performing as necessary. Where diversion from the desired plan of operation of the furnace is indicated by some difference in sample or temperature, the device of the applicant enables the ascertainment of the difficulty, and even more particularly the exact place within the flue where the difficulty is existent. Thereafter by suitable adjustment of the burners, the conditions may be rectified so that the furnace is again operating in its highest efficient state.

My invention further contemplates other details of construction and operation, an understanding of which will be had upon reference to the following detailed description of the construction employed, and its operative phases, in conjunction with the accompanying drawings, in which:

Fig. 1 is a sectional view of a conventional form of breeching or duct wall structure showing the mounting of the control section of the sampling tube, and the thermocouple, therein, along with the operating mechanism external to said duct for the operation of the sampling tube, and including the gas analysis box and recording instrument, the latter shown diagrammatically.

Figure 2 is a detail fragmentary view showing more clearly the mode of mounting the sampling tube at its elbow portion in the enclosing pipes therefor, one of the latter being disposed in the duct and the other external thereto.

Figure 3 is an enlarged view partly in section and partly in elevation, showing the Alundum thimble for filtering the gases, the nut and spring assembly therefor, and the means for connecting the operating and enclosing pipe means, with the sampling tube therein, to said thimble.

Figure 4 is a fragmentary view of the duct showing the movable sampling tube as mounted therein, and dotted lines showing the range of traverse of said tube across the duct under operating conditions of the invention, said movement being about 180° as shown.

Figure 5 is a detail view, primarily in section, of the type of double sytlus recording means which may be employed for the recorder for gas analyses and that for temperature conditions, the styli being shown in one adjusted position with one of them operative.

Figure 6 is a view showing a portion of the view of Figure 5, but with the styli in another adjustment, the other one of the styli being shown in operating position on the chart.

Figure 7 is a detail view of the reversing arm or member carried by the sampling tube operating pipe, as associated with the reversing switch of the synchronous motor the view being a section about on the line 7—7 of Figure 1.

Figure 8 is a detail sectional view showing more clearly how the base upon which the motor and certain other parts of my invention is adjustably mounted in order to effect a movement of the supporting pipe and sampling tube carried thereby for adjusting the section of the sampling tube to different locations in the duct in which it is mounted.

Figure 9 is a view showing a section of the recording chart which may be used for both of the recording instruments employed according to my invention, black dots illustrating the recordings when the sampling tube in the duct is traveling from left to right, we will say, and open dots showing the direction of movement when recording, after reversal of said direction of movement of the sampling tube. In lieu of black dots and open dots, black dots and red dots may be employed and recorded by the styli of the recording instrument.

Figure 10 is a sectional view taken about on the line 10—10 of Figure 2.

Figure 11 is a fragmentary vertical sectional view longitudinally of the inner and outer tube sections about at the point marked $x$ in Figure 1, showing packing there provided.

Describing now the details of the construction of my invention, and referring particularly to Figure 1 of the drawings, 1 denotes the furnace outlet or passage comprising the customary breeching or duct walls 2. In the said duct or passage 1, which may be a common form of furnace outlet, I locate the Pyrex sampling tube 3 which, as shown, is disposed vertically in the outlet or passage 1 in respect to the main portion that is located within said outlet. The sampling tube is preferably made of a continuous angular length of tube, the lower or horizontal portion of which extends laterally through one of the duct walls at an opening 4 in the latter, at which is located the closing plate 5 which is centrally apertured. The sampling tube 3 is carried within a supporting pipe comprising the vertical section 6 within the duct 1 and enclosing the vertical portion of the sampling tube 3, also in the duct. The pipe section 6 is connected to a horizontal pipe section 7 by means of a connector plate 8, see Figures 1 and 2, and the said pipe section 7 passes through the opening in the plate 5 that generally closes the larger opening 4 previously referred to.

At the upper end of the pipe 6 is attached the Alundum thimble which filters the gases that enter the upper open end of the sampling tube 3 that operates within the duct 1, the mode of connection of the pipe section 6 with the thimble 9 being illustrated in Figure 3, which also shows how the sampling tube enters said thimble. The filtering thimble unit is conventional and well known in the art and does not form any special feature of my present invention.

The supporting section 7 of the pipe sections 6 and 7 is carried in its horizontal disposition in bearings 10 of a support 11 mounted upon a movable or adjustable base 12 carried by any supporting means 13. The base 12 likewise carries the synchronous motor 14, with which is associated the reversing switch 15, and the motor is connected through a reduction gear unit 16 to an operating gear 17 which drives the driven gear 18 which is arranged to surround and is attached to the pipe section 7 to rotate the same in an oscillatory manner. The oscillation of the pipe section 7 is designed to cause a traverse of the vertical portion of the tube 3 and the associated supporting portion of the pipe 6 in substantially the manner illustrated in Figure 4; in other words, the parts 3 and 6 as disposed in the duct 1 will be given a back and forth oscillating movement over an arc of approximately 180°. This movement carries the filtering thimble 9 from a point adjacent to one wall of the duct 1 to a point adjacent the opposite wall, and of course thus shifting the sampling tube receiving end over substantially the entire cross sectional area of said duct 1. The lower or horizontal section of the sampling tube 3, after it passes through the outer end of the pipe 7, see Figure 1, is connected by a rubber gas sampling tube 3a to the gas analysis cell box 19, the latter having the aspirator connection 20 for drawing gas from the breaching or duct 1 through the sampling tube 3 and said cell box 19.

As seen in Figures 1 and 7, there is provided on the rotative pipe 7 a trip arm 21 for cooperation with the switch lever 15 on the motor 14.

Mounted on the pipe section 6 and located at one side of the filtering thimble 9 is a thermocouple 22 connected by a conductor or wire 23 that leads to the potentiometer or temperature recorder designated 24. A conductor wire 25 extends from the cell box 19 to the recorder 26 for transmitting gas analyses from the cell box to said recorder 26.

The base 12 previously referred to as carrying the support 11 for the pipe section 7 and the motor 14 and switch box for the switch 15 is intended to be adjustable to the left and right as seen in Figure 1 for thereby bodily shifting the pipe section 7, the pipe section 6, and the sampling tube 3 in corresponding directions for the adjustment of the vertical portion of the sampling tube 3 arranged in the duct 1 so as to bring this portion of the sampling tube closer or farther from one of the walls 2 of said duct. The foregoing construction is advantageous in that the shifting of the sampling tube 3 in the manner described affords a flexibility of adjustment of the same in the duct 1 which is very desirable in order to obtain gas sample analyses over different cross-sectional areas of the duct. The flexible conduit 3a forming a part of the gas sampling tube features leading to the cell box 19 permits of the shifting of the main sampling tube 3 of Pyrex by the corresponding shifting of the base 12. The base 12 may be attached to the part 13 by bolts as seen in Figure 8, the heads of the bolts entering T-grooves in the part 13, in order to permit of the desired adjustment referred to, the bolts being loosened in order to move the base 12 and then being tightened to hold it in a desired position.

In the operation of my invention, the motor 14, when started, will, through the drive gearing 17, 18, cause the oscillation of the lower pipe section 7 and thereby cause the oscillation of the sampling tube 3 portion within the duct 1 and the parts 6 and 9 which are rigidly attached therewith. The members 7, 6, and 3 will be oscillated in one direction until the arm or member 21 on the pipe section 7 strikes the switch lever 15 and causes a reversal of the movement of the part of the sampling tube in the duct 1, as well as the horizontal section of said sampling tube. As soon as the motor 14 is reversed, the sampling tube 3 within the duct is caused to move in an opposite direction to an extent of approximately 180°, and this reversing traversing movement is caused to continue so long as the motor 14 is in operation.

As seen in Figures 5 and 6, the recorders 24 and 26 will be equipped with the double stylus recording members 27 and 28. The styli 27 and 28 may be provided with a rocker mounting 29, connected by the slotted arm 30 with a solenoid 31. This solenoid will be included in the electric circuit connections running from the motor and switch 15 to the recording instrument, so that, upon the actuation of the reversing switch lever 15 the solenoid 31 will be actuated to cause a rocking of the two stylus members 27 and 28 to shift the recording function of one of these members to the other member in a self-evident manner.

Of course, any suitable means may be utilized for operating the alternately recording stylus members 27 and 28, though I do not wish to be confined to any special single means such as is set forth herein as an operative construction. One stylus, 27, may record in black, and the other stylus, 28, may record in red, or their recording dots may be black or red continuing lines, or rendered distinctive in any other manner whereby to advise the operator the particular direction in which the sampling tube member 3 in the duct 1 is moving. In this manner the user of my apparatus practicing the method of control thereof is accurately informed as to the nature of the recordings upon the instruments 24 and 26 as regards the particular direction of traverse of the sampling tube 3 in the duct 1 when the particular temperatures and analyses are being recorded upon the charts of the said instruments 24 and 25.

The use of the supporting pipe sections 6 and 7 is of course availed of as a simple method of assembling the right-angularly bent sampling tube 3 within the said members 6 and 7, and the bracket part 8 which connects the parts 6 and 7 may be detachably secured, at 32, see Figures 2 and 10, to the pipe section 7.

The plate 5, which is bolted to a wall of the duct 1 at the opening 4 may be removed when it is desired to remove the sampling tube and associated parts 6, 23, 22, and 9, from within the duct 1, for purposes of repair or otherwise. It is contemplated to use suitable gas analysis means of known practice in conjunction with my invention, as hereinbefore premised.

The time of one complete traverse 180° of movement for the sampling tube 3 within the duct 1 and the associated filtering thimble 9 may be varied at will, as for instance to occupy a period of 15 minutes or one-half hour, more or less. Since the recordings on the charts of the instruments 24 and 26 may be printed red when the sampling tube is traveling from left to right, or in one direction, and printed in black when the sampling tube is moving from right to left, or in an opposite direction, the operator can quickly read and identify the exact position of the recordings of both the gas samplings and the temperature conditions.

A counterweight 30 is secured to the pipe section 7 to counterbalance the sampling tube 3, pipe 6, supported parts, and hold the same in equilibrium.

At the point $x$ a packing will preferably be provided to prevent atmospheric pressure from entering between the inner tube 3 and the outer tube section 7.

Having thus described my invention, what I claim as new and desire to secure by Letters Patent of the United States, is:

1. The method of taking gas samples from a duct or passage through which gases are passing, which includes moving the sample receiving portion of a sampling tube in different directions over a section of the area of said duct, and recording the analyses of the samples received by the tube in one manner as the tube moves in one direction, and in a different manner as the tube moves in another direction.

2. The method of taking gas samples from a duct or passage through which gases are passing, which includes moving the sample receiving portion of a sampling tube in different directions over a section of the area of said duct, and recording the temperatures of the samples received by the tube in one manner as the tube moves in one direction, and in another manner as the tube moves in another direction.

3. In combination, a duct through which gases pass, a sampling tube of angular form having an arm thereof provided with a sample receiving portion at its outer end and mounted to move over the area of the duct, and the other arm extending transversely through a wall of the duct, an automatic reversing motor to move the said other arm and to cause the reverse movement of the tube duct arm in the duct, and means to continuously analyze and record the samples of gas entering the duct tube arm as it is moved by the reversing motor including connections on the axis of said other arm.

4. In combination, a duct through which gases pass, a sampling tube of angular form having an arm thereof provided with a sample receiving portion at its outer end and mounted to move over the area of the duct, and the other arm extending transversely through a wall of the duct, an automatic reversing motor to move the said other arm and to cause the reverse movement of the tube duct arm in the duct, and means to continuously record temperatures of samples of gas entering the tube duct arm as it is moved by the reversing motor including connections on the axis of said other arm.

5. The method of taking gas samples from a duct or passage through which gases are passing, which includes moving the sample receiving portion of a sampling tube in different directions over a section of the area of said duct, and recording the analyses of the samples received by the tube in one manner as the tube moves in one direction, and in a different manner as the tube moves in another direction; also simultaneously recording the temperature of the samples of said analyses, in one manner as the tube moves in one direction, and in another maner as the tube moves in another direction.

6. Apparatus for identifying and analyzing strata of flue gases emanating from corresponding burners in a common exhaust duct comprising: a sampling tube having an inlet within the duct, and extending through the wall of the duct; motive means to move the sampling tube to and fro within the duct to traverse the several strata of flue gases; means connected to said tube to continuously analyze samples of gas traversed by said sampling tube inlet; a recorder for said analyser; multiple means in said recorder to identify to and fro movements of said sampling tube; and means to synchronize the multiple recording means with the to and fro movement of said motive means.

7. The method of determining combustion conditions within a furnace or the like, which comprises withdrawing samples of gases continuously in a cycle from a plurality of positions in a zone through which gases generated as products of combustion pass, analyzing the samples continuously, recording the analysis of each successive sample in a manner indicating the composition of the sample and the position from which the sample was withdrawn during the first part of the cycle, making a further record distinguishable from that first mentioned, by recording the analysis of each successive sample in a manner indicating the composition of the sample and the position from which the sample was withdrawn during the remainder of the cycle, and coordinating the said records to enable point by point comparison.

8. The method of determining combustion conditions within a furnace or the like, which comprises withdrawing samples of gases continuously in a cycle from a plurality of positions in a zone through which gases generated as products of combustion pass, taking the temperatures of the samples continuously, recording the temperature of each successive sample in a manner indicating the temperature and the position at which the temperature was taken during the first part of the cycle, making a further record distinguishable from that first mentioned by recording the temperature of each successive sample in a manner indicating the temperature and the position at which the temperature was taken during the remainder of the cycle, and coordinating the said records to enable point by point comparison.

9. The method of determining combustion conditions within a furnace or the like, which comprises withdrawing samples of gases continuously in a cycle from a plurality of positions in a zone through which gases generated as products of combustion pass, analyzing each sample and simultaneously taking the temperature of each sample, making a first record of the analysis of each sample comprising indicating in one manner on the record the composition of the sample and the position from which the sample was withdrawn in the first part of the cycle, and indicating in a distinctive manner on the record the composition of the sample and the position from which the sample was withdrawn in the remainder of the cycle, coordinating the indications of the analyses of the samples withdrawn during the first part of the cycle, with the indications in the remainder of the cycle, making a second record simultaneously with the first record, which comprises indicating in one manner on the second record the temperature of each successive sample and the position at which the temperature of the sample withdrawn was taken in the first part of the cycle, and indicating in a distinctive manner on the record the temperature and the position at which the temperature of the sample withdrawn was taken during the remainder of the cycle, coordinating the indications of the temperatures taken in the first part of the cycle with the indications of the temperatures taken in the remainder of the cycle, and coordinating the said first record relating to analyses of the samples, with the record relating to temperatures of said samples throughout the cycle, to enable point by point comparison of the respective records.

ARMAND BUR.

References Cited in the file of this patent

UNITED STATES PATENTS

| Number | Name | Date |
|---|---|---|
| 594,533 | Henius | Nov. 30, 1897 |
| 1,658,391 | Potter | Feb. 7, 1928 |
| 1,779,619 | Potter | Oct. 28, 1930 |
| 2,020,529 | Thorsten | Nov. 12, 1935 |
| 2,065,703 | Hubbard | Dec. 29, 1936 |
| 2,109,222 | Ryder | Feb. 22, 1938 |
| 2,285,457 | Obermaier | June 9, 1942 |
| 2,290,075 | Schlumberger | July 14, 1942 |
| 2,341,727 | Krogh | Feb. 15, 1944 |
| 2,370,260 | Robison | Feb. 27, 1945 |

OTHER REFERENCES

"Measuring $CO_2$ Electrically" (Catalog No. 32) of Brown Instrument Co., Philadelphia, Pa., 1924.